United States Patent [19]
Fontaine

[11] Patent Number: 5,503,445
[45] Date of Patent: Apr. 2, 1996

[54] FOOT-OPERATED APPLIANCE FOR A DIGGING TOOL AND METHOD OF USE

[76] Inventor: Robert R. Fontaine, 19452 Cedarcreek, Canyon Country, Calif. 91351

[21] Appl. No.: 411,903

[22] Filed: Mar. 28, 1995

[51] Int. Cl.$^6$ ..................................................... A01B 1/00
[52] U.S. Cl. ...................................................... 294/60
[58] Field of Search ..................... 294/49, 59, 60; 30/315, DIG. 5; 254/131.5, 132; 172/371, 378, 380, 381, 18

[56] References Cited

U.S. PATENT DOCUMENTS

| | | | |
|---|---|---|---|
| 493,110 | 3/1893 | Orthwein | 294/60 |
| 648,804 | 5/1900 | Sheehan | 294/60 X |
| 678,373 | 7/1901 | Blaser | 294/60 X |
| 754,543 | 3/1904 | Christiansen | 294/60 |
| 910,274 | 1/1909 | Duprey | 254/131.5 |
| 1,033,980 | 7/1912 | Belknap | 294/60 |
| 1,109,758 | 9/1914 | James | 294/60 |
| 1,119,605 | 12/1914 | Hunt | 294/60 |
| 1,331,495 | 2/1920 | Gibson | 294/60 |

FOREIGN PATENT DOCUMENTS

| | | | |
|---|---|---|---|
| 113646 | 3/1945 | Sweden | 294/60 |
| 120185 | 11/1947 | Sweden | 294/60 |
| 168118 | 8/1921 | United Kingdom | 294/60 |
| 2120511 | 12/1983 | United Kingdom | 294/60 |

*Primary Examiner*—Johnny D. Cherry
*Attorney, Agent, or Firm*—Ted Masters

[57] ABSTRACT

A foot-operated appliance (20) for a digging tool (500) such as a shovel, spade, trencher or the like includes a longitudinally truncated sleeve (22) contoured to fit partially around the socket (508) of the digging tool (500). A substantially planar pedal (30) is connected to the sleeve (22) and projects outwardly therefrom. A U-bolt (40) and a retaining bar (42) connect the sleeve (22) around the socket (508). Pedal (30) is angled to be substantially perpendicular to the axis (518) of the blade (502) of the digging tool (500).

5 Claims, 4 Drawing Sheets

FIG. 6
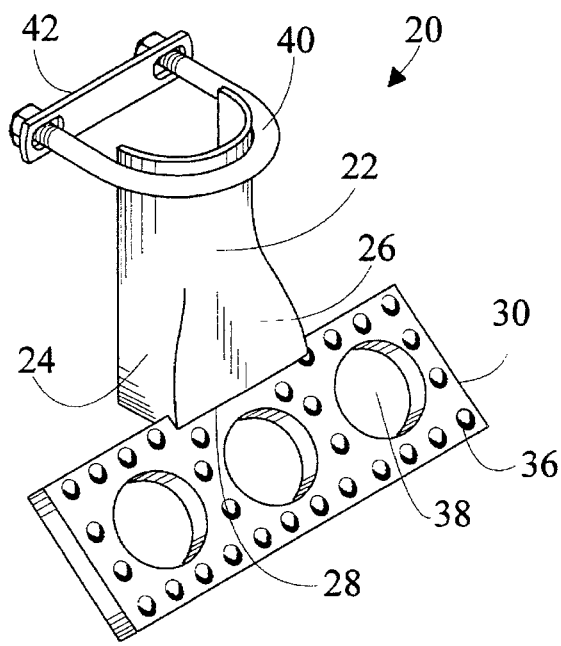
FIG. 7
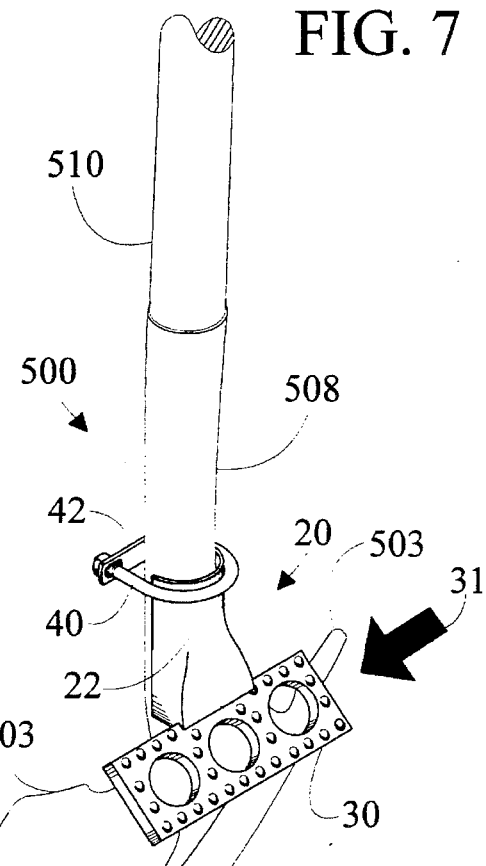
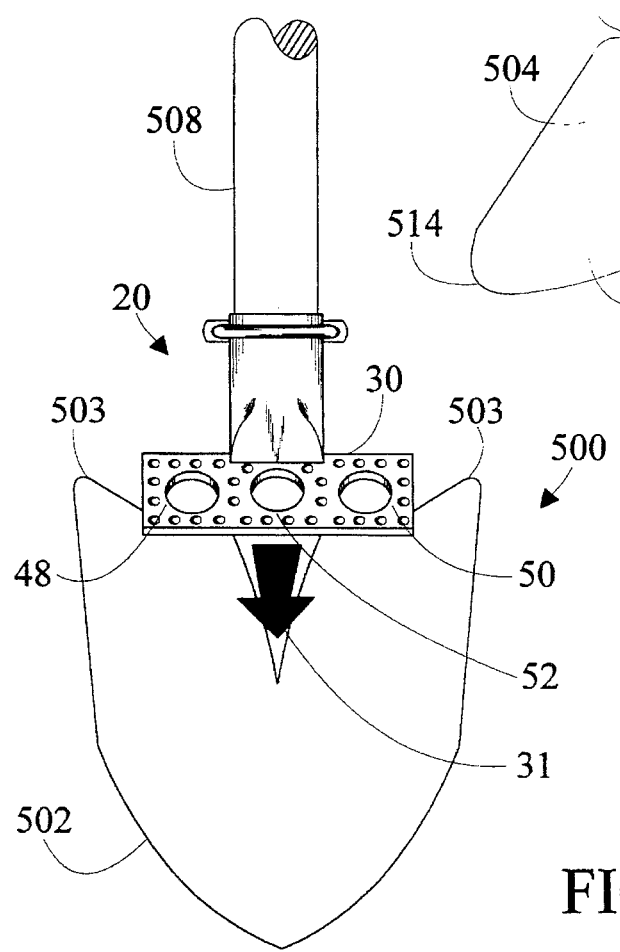
FIG. 8

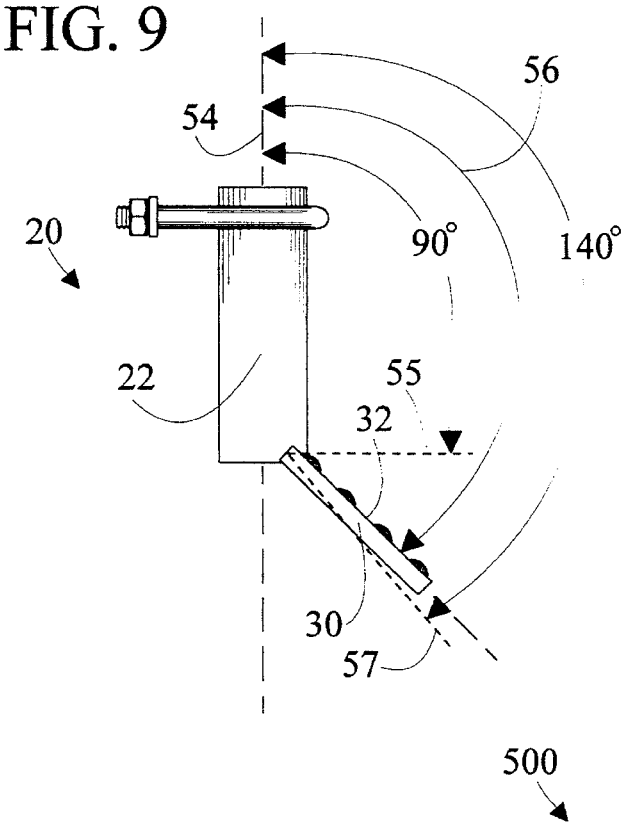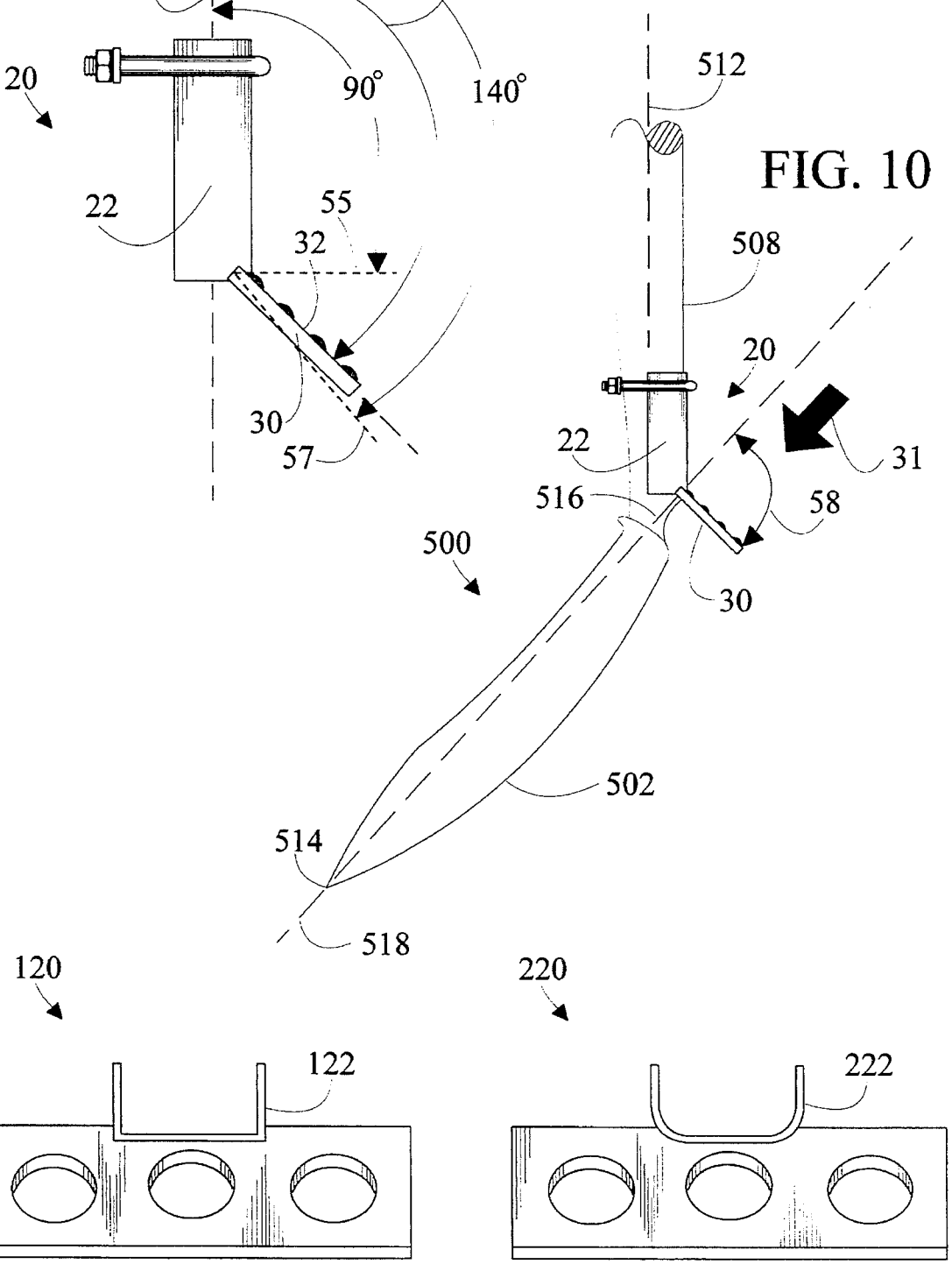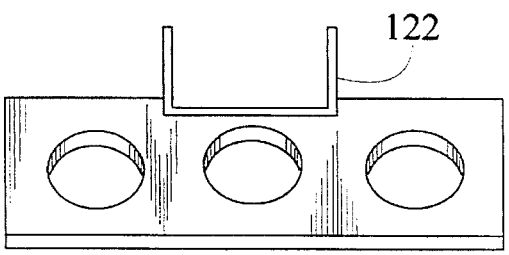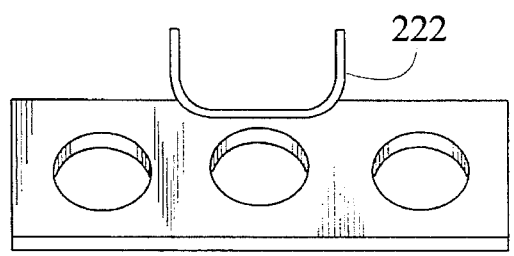
FIG. 9
FIG. 10
FIG. 11
FIG. 12

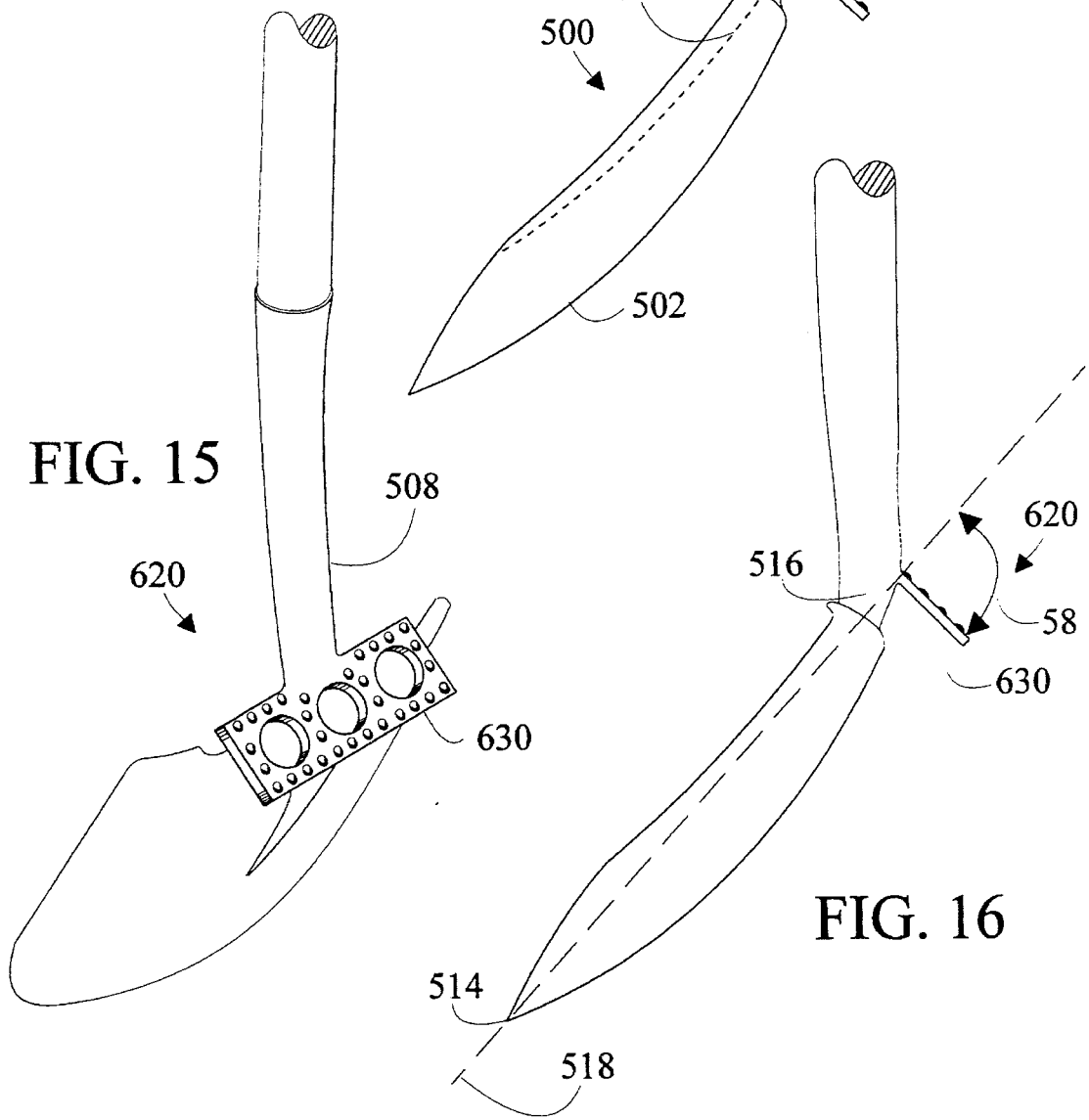

5,503,445

FOOT-OPERATED APPLIANCE FOR A DIGGING TOOL AND METHOD OF USE

TECHNICAL FIELD

The present invention pertains to digging tools, and more particularly to a foot-operated appliance and method of use wherein the appliance fits around the socket of the digging tool and force applied thereto by the foot facilitates the digging process.

BACKGROUND ART

A multitude of improved digging tools have been known in the art for many years. Each of these devices is targeted in some way at improving the efficiency of the digging process. For example, U.S. Pat. No. 3,226,149 shows an improved spade, shovel, and spading fork. The tool includes a central footrest integral with the spade that is adapted for a workman's foot. Pressure is applied along a central axis of the tool thereby permitting easy driving of the blade into the ground. A foot guard encompasses the workman's foot to prevent it form slipping, and a pair of telescoping sleeves allow adjustment of the length of the handle. U.S. Pat. No. 3,456,663 describes a combined walking cane and shovel. The device is provided at its lower end with a hinged shovel or scoop of relatively small size and by which refuse can be readily picked up and carried to suitable disposal locations. The shovel or scoop is pivotally mounted and includes means for maintaining it in either an operative or inoperative position. U.S. Pat. No. 3,506,296 discloses an optional digger for garden and lawn which includes a tubular digging tool for lifting a cylindrical clod of earth. A foot lever is adjustably mounted around the outer side of the tube, the foot lever providing a means of an operator's foot to bear thereagainst in order to exert pressure when forcing the tube into the ground. U.S. Pat. No. 4,180,289 depicts a gardening tool having a straight handle and a tool head such as a spade blade which is pivoted about a traverse axis. A laterally extending pedal at the lower part of the tool enables foot pressure to be applied to the tool. U.S. Pat. No. 4,904,011 defines a shovel formed of a blade member, two side members, a handle retaining member and a handle. A foot pressure rest is provided with the blade which allows pressure to be placed on the blade by the foot of the user. U.S. Pat. No. 5,085,478 portrays a cushioning step for a shovel and the like. The step has an elongated elastomeric member which fits on the top edge of the blade of a tool. A clip is used to attach the step to the blade.

DISCLOSURE OF INVENTION

The present invention is directed to improved digging tools such as shovels, spades, trenchers and the like, and specifically to a foot-operated appliance having a foot-engaging pedal attached to the socket of the digging tool so that foot force may applied to facilitate the digging process. The foot-operated appliance is particularly useful when digging into hard surfaces or breaking ground.

In accordance with a preferred embodiment of the invention, the foot-operated appliance includes a longitudinally truncated sleeve contoured to fit partially around the socket. A substantially planar pedal is traversely connected to the sleeve and projects outwardly therefrom. A clasping means firmly connects the sleeve around the socket.

In accordance with an important aspect of the invention, the clasping means includes a U-bolt removably connected to a retaining bar. The U-bolt and the retaining bar hold the sleeve fixedly in place on the socket.

In accordance with an important feature of the invention, the sleeve has a first end and an opposite second end, the shape of the sleeve transitioning from substantially semi-circular at the first end to substantially channel-shaped at the second end.

In accordance with another important aspect of the invention, the pedal has a plurality of holes useful in the elimination of slip-inducing mud.

In accordance with another important feature of the invention, the pedal has a top foot-engaging surface having a plurality of friction-enhancing protuberances.

In accordance with another important aspect of the invention, the pedal extends outwardly over the shoulders of the blade of the digging tool.

In accordance with another important feature of the invention the sleeve includes tongues which abut the front surface of the blade and prevent the sleeve from rotating around the socket.

In accordance with a preferred embodiment of the invention, the sleeve is oriented along an axis and the foot-engaging surface of the pedal is angled at between 900 and 140° from the axis.

In accordance with another preferred embodiment of the invention, the blade has a blade axis, and when installed on the digging tool, the pedal is oriented substantially perpendicular to the blade axis.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 6 is a perspective view of the appliance;

FIG. 7 is a reduced perspective view of the appliance installed on a digging tool;

FIG. 8 is a reduced front view of the appliance installed on a digging tool;

FIG. 9 is a side view of the appliance showing the angle of the pedal;

FIG. 10 is a reduced side view of the appliance installed on a digging tool;

FIG. 11 is an end view of a second embodiment;

FIG. 12 is an end view of a third embodiment;

FIG. 13 is an end view of a fourth embodiment;

FIG. 14 is a reduced side view of a fifth embodiment installed on a digging tool;

FIG. 15 is a reduced perspective view of a sixth embodiment; and,

FIG. 16 is a reduced side view of the sixth embodiment.

MODES FOR CARRYING OUT THE INVENTION

Figure 1:
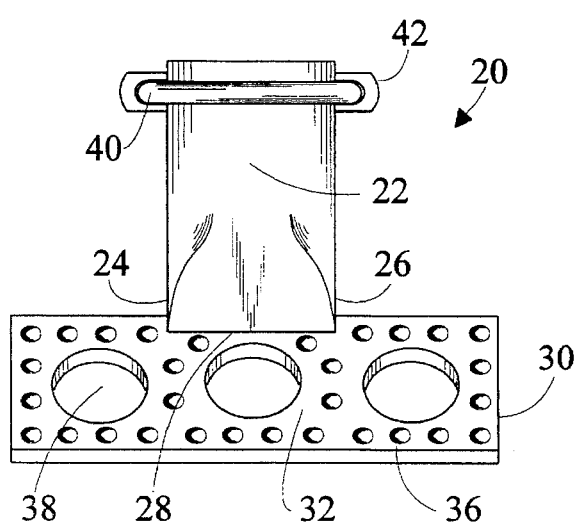
FIG. 1 is a front view of a foot-operated appliance for a digging tool in accordance with the present invention.

Referring initially to FIGS. 1, 2, 3, 6, and 7 there are illustrated front, side, rear, perspective, and reduced perspective views respectively of a foot-operated appliance for a digging tool in accordance with the present invention, generally designated as 20. The appliance 20 may be used with digging tools 500 such as shovels, spades, trenchers, or the like wherein the digging tool 500 has a blade 502 having shoulders 503, front 504 and back 506 blade surfaces, and a socket 508 connecting the blade 502 to a handle 510. The appliance 20 includes a longitudinally truncated sleeve 22 which is contoured to fit partially around socket 508. Sleeve 22 has a first side 24, and opposite side 26, and a middle portion 28 therebetween (refer also to FIG. 5). A substantially planar pedal 30 is traversely connected across the middle portion 28 of sleeve 22 and projects outwardly therefrom. In a preferred embodiment pedal 30 is centered across middle portion 28. By having pedal 30 centered across middle portion 28 of sleeve 22, in the installed configuration, pedal 30 is also centered above blade 502 and foot force may be downwardly applied in direction 31 to blade 502 without developing any bending moment (such as is the case when foot force is applied to one shoulder 503 of blade 502 (refer also to FIG. 8). Pedal 30 has a shoe-engaging top surface 32 and an opposite bottom surface 34. In a preferred embodiment, a plurality of friction-enhancing protuberances 36 are disposed on top surface 32, thereby reducing any tendency for the user's shoe to slip off of pedal 30 when in use. In another preferred embodiment, pedal 30 includes a plurality of holes 38 which are useful when the appliance 20 is used to dig in moist soil. Any moist soil that clings to the bottom of the user's shoe will be eliminated by extrusion through holes 38 and thereby also reduce any tendency for the user's shoe to slip off pedal 30. In the installed configuration, a clasping means connects sleeve 22 around socket 508 of digging tool 500. In the illustrated embodiment, the clasping means includes a U-bolt 40 removably connected to a retaining bar 42. As shown in FIG. 7, U-bolt 40 holds appliance 20 fixedly in place around socket 508 so that pedal 30 projects outwardly from socket 508 in the direction of back surface 506. U-bolt 40 can either be fixedly connected to sleeve 22, or alternatively can be a separate element. Numerous other clasping means may also be employed to attach sleeve 22 onto socket 508 such as a hinged clamp, a curved bolt, aligned holes in both sleeve 22 and socket 508 which accept a radial bolt or screw, etc. An alternative clasping means is illustrated in FIG. 13.

Appliance 20 offers several key digging advantages. In that appliance 20 is mounted on socket 508, it is above shoulders 503 of blade 502. Therefore, when foot force is applied, blade 502 may be driven deeper into the soil than is possible by applying foot force to shoulders 503. Also, in that appliance 20 is selectively attachable and removable, it may be attached for effecting bulk digging, and may also be removed when precision digging or dressing of a hole is required. Additionally, pedal 30 offers a large surface area upon which to place the heel, sole, or shank of the shoe and apply considerable downward foot force. This is in contrast to the relatively sharp shoulder 503 of a conventional shovel. By virtue of the large surface area, the present invention does not cause discomfort/particularly when digging in hard soil or when using shoes with light weight soles.

Appliance 20 can be fabricated in a variety of ways from a variety of materials. For example, sleeve 22 and pedal 30 may be cast as a single assembly or may be individually fabricated and welded together. In a preferred embodiment, sleeve 22 and pedal 30 are cast from aluminum/zinc compound ZA27.

The present invention is used by installing foot-operated appliance 20 on socket 508 of digging tool 500 so that pedal 30 projects outwardly from socket 508 in the direction of back surface 506. The clasping means is engaged so as to secure appliance 20 around socket 508. The digging tool 500 is placed in a ready-for-use position with tip 514 of blade 502 resting on the surface of the soil. Foot force is then applied to pedal 30 in direction 31 causing blade 502 to enter the soil.

Figure 2:
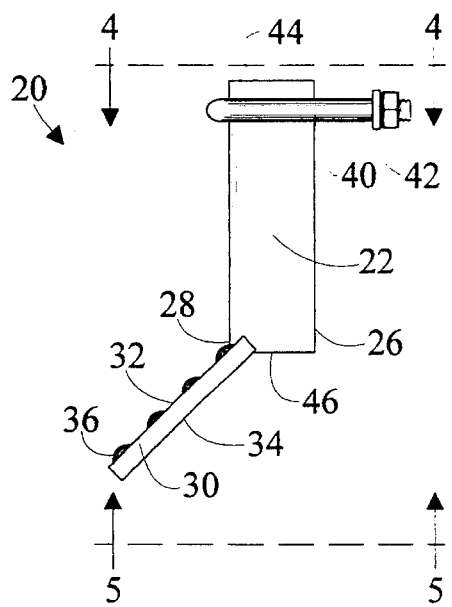
FIG. 2 is a side view of the appliance.
Figure 3:
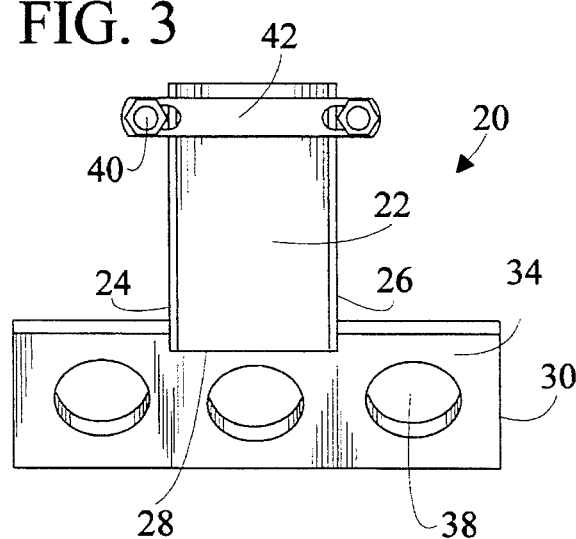
FIG. 3 is a rear view of the appliance.
Figure 4:
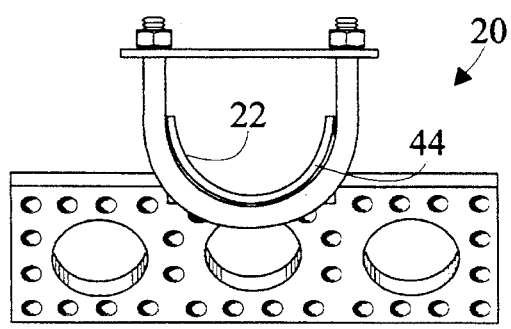
FIG. 4 is an end view of the appliance along the line 4—4 of FIG. 2.
Figure 5:
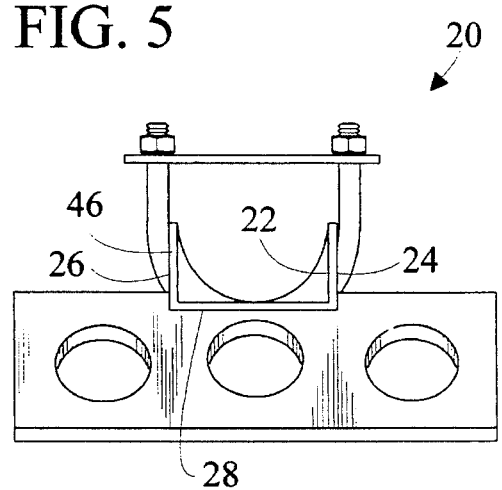
FIG. 5 is an end view of the appliance along the line 5—5 of FIG. 2.

FIG. 4 is an end view of the appliance 20 along the line 4—4 of FIG. 2, and FIG. 5 is an end view of the appliance 20 along the line 5—5 of FIG. 2. Sleeve 22 has a first end 44 and an opposite end 46. The shape of the sleeve transitions from substantially semi-circular at first end 44 to substantially channel-shaped at opposite end 46. This design is preferred because it matches the contour of socket 508. It allows the top of sleeve 22 to closely fit partially around the substantially cylindrical upper portion of socket 508, and also provides a squared bottom portion of sleeve 22 which better fits the flattened lower portion of socket 508.

FIG. 6 is a perspective view of the appliance 20 showing sleeve 22 having first side 24, second side 26, and middle portion 28, pedal 30 having friction-enhancing protuberances 36 and holes 38, and clasping means including U-bolt 40 and retaining bar 42.

FIG. 7 is a reduced perspective view of the appliance 20 installed on a digging tool 500. Foot force is applied perpendicularly to pedal 30 in direction 31 to drive blade 502 into soil or other material.

FIG. 8 is a reduced front view of the appliance 20 installed on a digging tool 500 having blade 502 and two shoulders 503. When appliance 20 is centrally installed on socket 508, pedal 30 extends outwardly over both shoulders 503. The large surface area allows the application of foot force to left side 48, right side 50, or middle 52 of pedal 30. The foot force may be applied in direction 31 with either the sole, heel, or shank of the user's shoe. Alternatively, the shoe may be longitudinally aligned with pedal 30 permitting foot force to be simultaneously applied to the entire pedal 30.

FIG. 9 is a side view of the appliance 20 showing the angle of pedal 30. Sleeve 22 is longitudinally oriented along axis 54. When viewed from the side, top surface 32 forms an angle 56 with sleeve axis 54. Angle 56 is selected so that when appliance 20 is installed on digging tool 500, pedal 30 is substantially perpendicular to blade 502 (refer to FIG. 10). This important feature of the present invention allows the foot force applied to pedal 30 to be substantially aligned with blade axis 518 (refer to FIG. 10) thereby maximizing the force delivered to blade 502. Angle 56 is selected to accommodate the different blade axes 518 of various digging tools. To this end, angle 56 between top surface 32 of pedal 30 and sleeve axis 54 may range anywhere between 90° (for sleeve axis 54 to minimum pedal axis 55) and 140° (for sleeve axis 54 to maximum pedal axis 57) depending on the specific digging tool design.

FIG. 10 is a reduced side view of the appliance 20 installed on a digging tool 500. Digging tool 500 has a tip 514 and a neck 516 and blade axis 518 passing therebetween. Pedal 30 is angled so that when sleeve 22 is connected around socket 508, pedal 30 is substantially perpendicular to blade axis 518 and angle 58 is substantially 90°. By making angle 58 substantially 90°, foot force applied in direction 31 is aligned with blade axis 518. If angle 58 is not 90°, then the component of foot force delivered to blade 502 in direction 31 is undesirably reduced. As is illustrated in FIG. 10, for some digging tools 500 blade axis 518 is not aligned with socket axis 512 of socket 508.

FIG. 11 is an end view of a second embodiment in the same direction as FIG. 5, designated as 120. In this embodiment, sleeve 122 is substantially channel-shaped.

FIG. 12 is an end view of a third embodiment in the same direction as FIG. 5, designated as 220. In this embodiment, sleeve 222 is substantially U-shaped.

FIG. 13 is an end view of a fourth embodiment in the same direction as FIG. 5, designated as 320. The clasping means includes first side 324 and second side 326 of sleeve 322 having opposing holes 321 and 323 respectively sized to receive retaining bolt 325. Sleeve 322 is placed around socket 508 of digging tool 500 (refer to FIG. 7) and bolt 325 holds sleeve 322 in place.

FIG. 14 is a reduced side view of a fifth embodiment installed on a digging tool 500 generally designated 420. First side 424 and opposite second side 426 (hidden) of sleeve 422 include two protruding tongues 427. Tongues 427 are shaped to abut front side 504 of blade 502. By abutting front side 504 of blade 502, tongues 427 serve to prevent installed sleeve 422 from rotating around socket 508.

FIG. 15 is a reduced perspective view of a sixth embodiment designated 620. A substantially planar pedal 630 is integral with socket 508 and projects outwardly therefrom. Pedal 630 is traversely centered on socket 508. In this embodiment pedal 630 is fabricated as an integral part of socket 508.

FIG. 16 is a reduced side view of the sixth embodiment 620. Blade axis 518 is defined by tip 514 and neck 516. Pedal 630 is angled so as to be substantially perpendicular to blade axis 518 with angle 58 being substantially 900.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A foot-operated appliance for a digging tool such as a shovel, spade, trencher, or the like, the digging tool having a blade having front and back surfaces, and a socket connecting the blade to a handle, the socket having a substantially cylindrical upper portion and a flattened lower portion, said foot-operated appliance comprising:

a longitudinally truncated sleeve contoured to fit partially around the socket, said sleeve having a first side, an opposite second side, and a middle portion therebetween;

a substantially planar pedal traversely connected across said middle portion of said sleeve and projecting outwardly therefrom;

a clasping means for connecting said sleeve around the socket; and, said sleeve having a first end and an opposite second end, said sleeve transitioning from substantially semi-circular at said first end to substantially channel-shaped at said second end, said first end adapted to fit partially around the substantially cylindrical upper portion of the socket, and said second end adapted to fit the flattened lower portion of the socket.

2. A foot-operated appliance according to claim 1, the blade further having a tip and a neck with a blade axis passing therebetween, said pedal angled so that when said sleeve is connected around the socket, said pedal is substantially perpendicular to the blade axis.

3. A foot-operated appliance according to claim 1, further including:

said sleeve longitudinally oriented along a sleeve axis;

said planar pedal having a top surface; and, when said pedal is viewed from the side, said top surface of said pedal and said sleeve axis forming an angle therebetween, said angle being between 95° and 128°.

4. A foot-operated appliance for a digging tool such as a shovel, spade, trencher, or the like, the digging tool having a blade having front and back surfaces, and a socket connecting the blade to a handle, said foot-operated appliance comprising:

a longitudinally truncated sleeve contoured to fit partially around the socket, said sleeve having a first side, an opposite second side, and a middle portion therebetween;

a substantially planar pedal traversely connected across said middle portion of said sleeve and projecting outwardly therefrom;

a U-bolt removably connected to a retaining bar for connecting said sleeve around the socket;

said sleeve having a first end and an opposite second end, said sleeve transitioning from substantially semicircular at said first end to substantially channel-shaped at said second end;

said pedal including a top surface having a plurality of friction-enhancing protuberances disposed thereon;

said sleeve oriented along an axis;

when said pedal is viewed from the side, said top surface and said axis forming an angle therebetween; and, said angle between said top surface of said pedal and said axis being between 90° and 140°.

5. A foot-operated appliance for a digging tool such as a shovel, spade, trencher, or the like, the digging tool having a blade having front and back surfaces, and a socket connecting the blade to a handle, the blade having a tip and a neck with a blade axis passing therebetween, said foot-operated appliance comprising:

a longitudinally truncated sleeve contoured to fit partially around the socket, said sleeve having a first side, an opposite second side, and a middle portion therebetween, said sleeve longitudinally oriented along a sleeve axis;

a substantially planar pedal traversely connected across said middle portion of said sleeve and projecting outwardly therefrom, said planar pedal having a top surface;

a clasping means for connecting said sleeve around the socket;

said pedal angled so that when said sleeve is connected around the socket, said pedal is substantially perpendicular to the blade axis; and, when said pedal is viewed from the side, said top surface of said pedal and said sleeve axis forming an angle therebetween, said angle being between 95° and 128°.

* * * * *